United States Patent [19]

Miyoshi

[11] Patent Number: 4,766,538
[45] Date of Patent: Aug. 23, 1988

[54] MICROPROCESSOR HAVING VARIABLE DATA WIDTH

[75] Inventor: Akio Miyoshi, Oume, Japan

[73] Assignee: Kabushiki Kaisha Toshiba, Kanagawa, Japan

[21] Appl. No.: 807,224

[22] Filed: Dec. 10, 1985

[30] Foreign Application Priority Data

Dec. 11, 1984 [JP] Japan ................................ 59-261377

[51] Int. Cl.⁴ ........................................... G06F 13/00
[52] U.S. Cl. ..................................................... 364/200
[58] Field of Search ... 364/200 MS File, 900 MS File

[56] References Cited

U.S. PATENT DOCUMENTS 4,466,055 8/1984 Kinoshita et al. .................... 364/200
4,663,729 5/1987 Matick et al. ........................ 364/900
4,667,305 5/1987 Dill et al. ............................. 364/900

FOREIGN PATENT DOCUMENTS 2021823 12/1979 United Kingdom .

OTHER PUBLICATIONS

Intel Microcomputer Components Handbook, Intel Corporation, 1980, pp. 3-412 through 416 and 3-334 through 337.

Primary Examiner—Eddie P. Chan
Attorney, Agent, or Firm—Foley & Lardner, Schwartz, Jeffery, Schwaab, Mack, Blumenthal & Evans

[57] ABSTRACT

A microprocessor having variable data width comprising a bus cycle changeover circuit between a command execution unit and each of an address output logic, a data input/output logic, and a bus controller. The bus cycle changeover circuit receives an address, data, a memory access instruction and a data width instruction from the command execution unit and modifies timings of them according to an externally supplied data width selection signal and transmits modified address, data, memory access instruction and data width instruction signals to the address output logic, the data input/output logic and the bus controller. The bus cycle changeover circuit comprises a cycle control circuit which outputs a signal expressing a latter half access cycle and an upper/lower selection circuit which selects upper/lower parts of the data bus according to an output signal of the cycle control circuit.

5 Claims, 7 Drawing Sheets

MICROPROCESSOR HAVING VARIABLE DATA WIDTH

BACKGROUND OF THE INVENTION

1. Field of the Invention

This invention relates to a microprocessor and, more particularly, to a microprocessor having a general-purpose architecture.

2. Prior Art

Large capacities of memory are needed to execute some types of jobs using a microprocessor. The bit width of a data bus by which the memories are accessed, is fixed for every type of conventional microprocessor.

FIG. 1 shows the interface part in a microprocessor, which interfaces with buses including a data bus.

The interface part comprises an address output logic 2 which receives an address signal from a command execution unit 1 and outputs the address signal to one of the address buses, a data input/output logic 3 which exchanges data between the command execution unit 1 and the data bus, and a bus controller 4 which receives the memory access instruction and data width command for the memory from the command execution unit 1 and transmits them to the bus.

In this type of interface part, the bit width of data bus is fixed and there is no room to change the bit width of the data bus.

As a result, the memory may have an excessive capacity for practical use.

For example, as shown in FIG. 2, in order to form a memory which is connected to a 16 bit wide data bus using 64 kbit RAM chips, the memory capacity will be 64 kbits × 16 = 1024 kbits = 128 kbytes.

Similarly, in the case of 32 bit wide microprocessor, to form the memory using 1 bit wide 256 kbit RAM chips, the memory capacity will be 256 kbits × 32 = 8192 kbits = 1024 kbytes = 1 Mbyte.

However, such a large capacity of the memory is not needed for a usual microcomputer system. That is, for the system using a microprocessor, it is sufficient to select the memory capacity adapted to the practical use. For example, there is a case where a 64 kbyte memory is sufficient for 16 bit wide microprocessor. In this example, as described above, since the memory capacity formed by using 64 kbit RAMs is 128 kbytes, 64 kbyte memory capacity is not used and is excessive. As a result, there is a difficulty in decreasing the cost of the system.

SUMMARY OF THE INVENTION

Accordingly, it is an object of the present invention to provide a microprocessor having variable width data which can establish a system without increasing memory capacity.

It is a further object of the present invention to provide a microprocessor which has high access speed.

It is another object of the present invention to provide a microprocessor which can change the data bus width automatically according to the condition of assembled memory boards.

In accordance with the present invention, there is provided a microprocessor comprising a command execution unit which executes various commands, an address output logic which outputs memory address to be accessed to an address bus, a data input/output logic which exchanges instructions and data between said command execution unit and a data bus, a bus controller which outputs control signals from said command execution unit to a control bus, and a bus cycle changeover circuit which is connected between the command execution unit and each of the address output logic, the data input/output logic and the bus controller, and which controls timing and address in order to transmit/receive data to/from a part of data bus according to a data width selection signal and data width selection instructions.

DESCRIPTION OF THE PREFERRED EMBODIMENT

Figure 1:
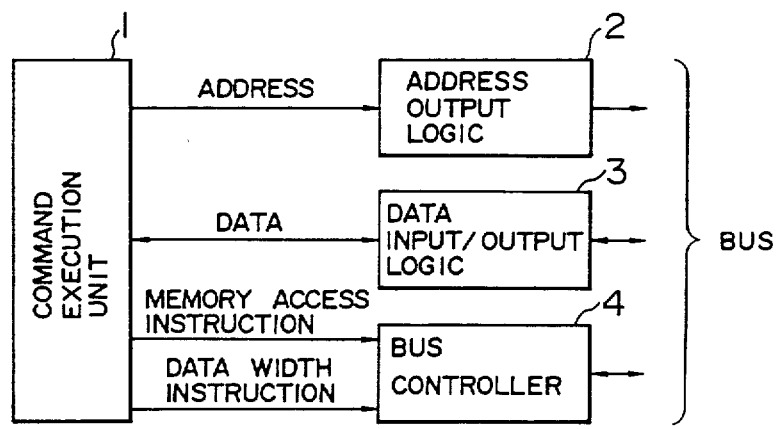
FIG. 1 illustrates the interface part of a microprocessor according to the prior art.
Figure 2:
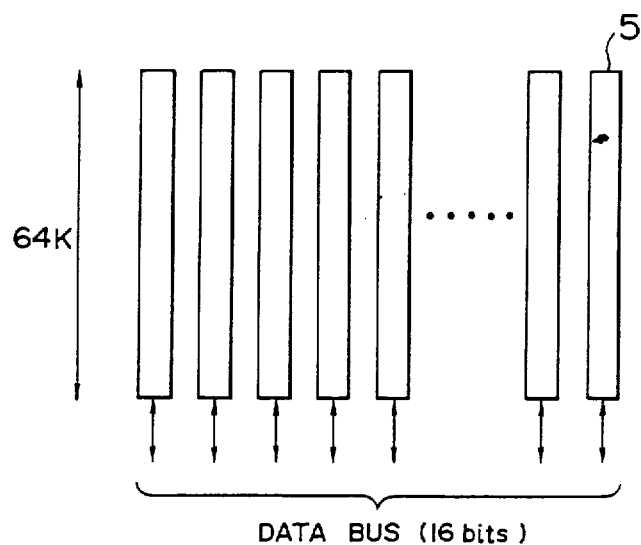
FIG. 2 illustrates formation of a memory using 64 kbit RAM connected to data bus.
Figure 3:
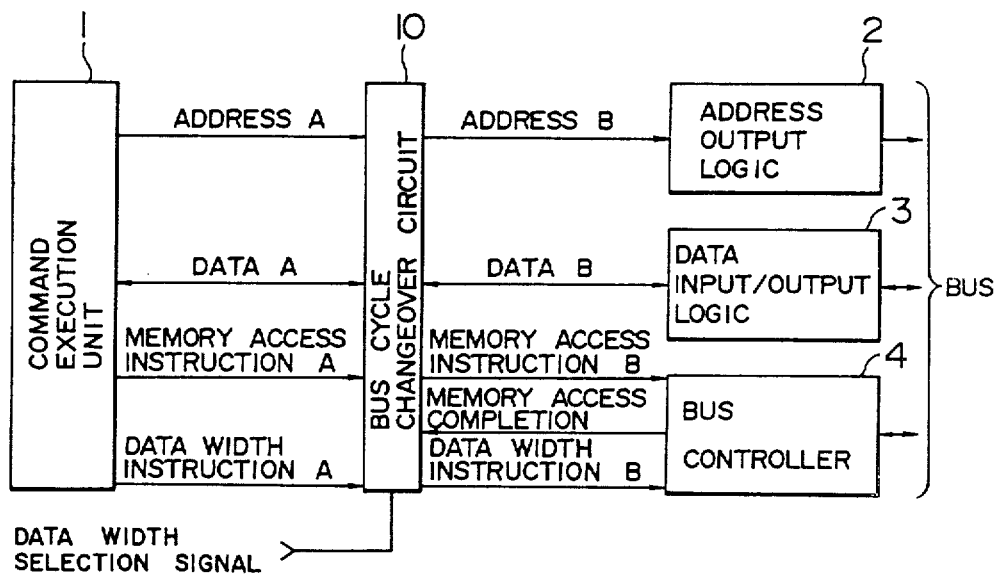
FIG. 3 is a block diagram of a microprocessor which illustrates a conception of the invention.

FIG. 3 shows a block diagram of an embodiment of the present invention comprising a bus cycle changeover circuit 10 between a command execution unit 1 and an address output logic 2, a data input/output logic 3 and a bus controller 4. Since the functions of the address output logic 2, the data input/output logic 3 and the bus controller 4 are the same as described before, their detailed description will be omitted.

Address, data, memory access instructions and data width instructions which are transmitted from the command execution unit 1 are expressed with letter "A". On the other hand, address, data, memory access instructions and data width instructions which are output from the command execution unit 1 to the address output logic 2, the data input/output logic 3 and the bus controller 4 respectively, are expressed with letter "B". Data A and B are expressed as bidirectional data because they are transmitted and received (exchanged) between the command execution unit and the data bus.

Figure 4:
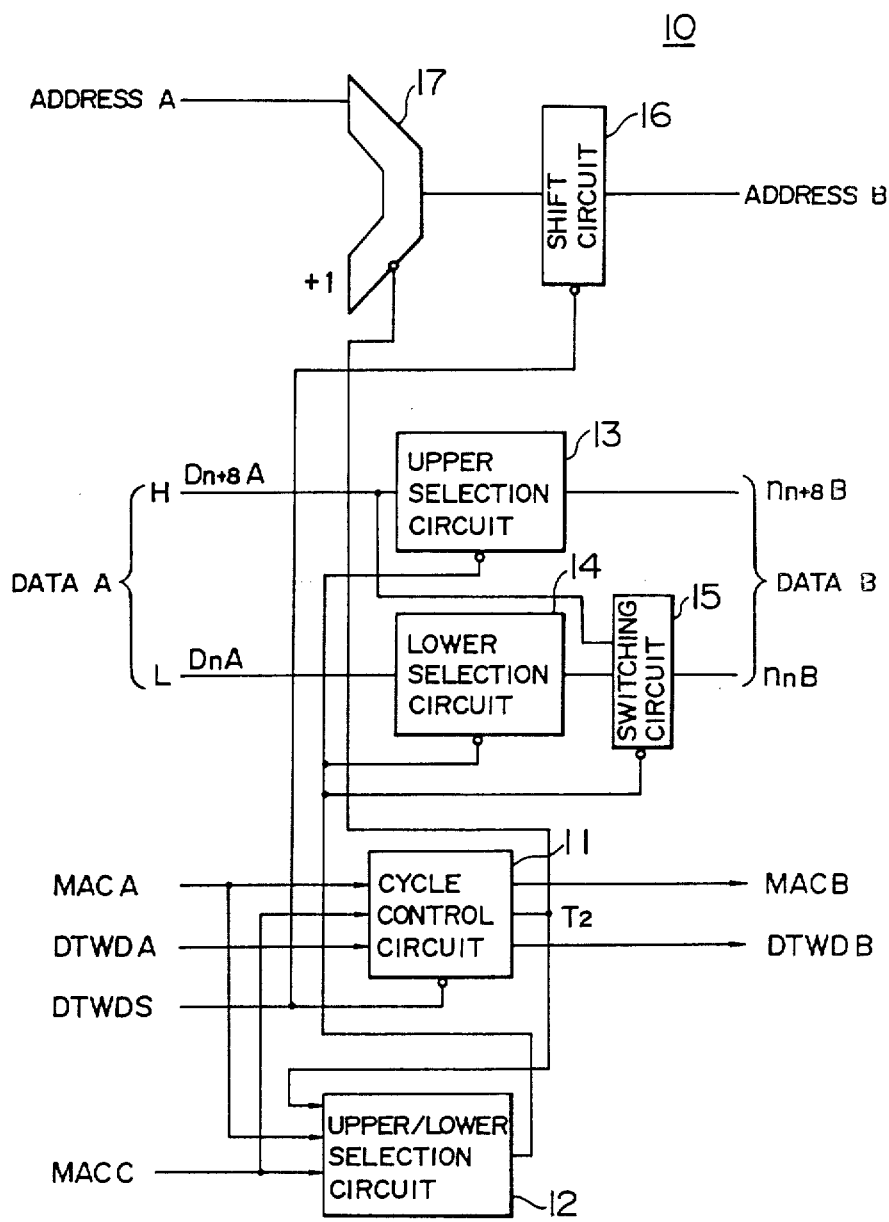
FIG. 4 is a block diagram illustrating detailed structure of a bus cycle changeover circuit according to the invention.

FIG. 4 shows the detailed structure of the bus changeover circuit 10.

This bus changeover circuit comprises a cycle control circuit 11, an upper/lower selection circuit 12, an upper selection circuit 13, a lower selection circuit 14, a switching circuit 15, an address shift circuit 16, and an adder 17.

The Memory ACcess instruction A (MACA), DaTa WiDth instruction A (DTWDA) and Memory ACcess Completion signal (MACC) are input to the cycle control circuit 11, and this circuit outputs Memory Access instruction B (MACB), DaTa WiDth instruction B (DTWDB) and $T_2$ signal which denotes the latter half cycle for using a part of the bus. The $T_2$ signal is input to the address adder 17 and the upper/lower selection circuit 12, respectively. In the address adder 17, the address A is incremented by 1 upon every generation of $T_2$ signal and the added output address is shifted by the address shift circuit 16 which shifts the address input according to the data width selection signal (DTWDS) and finally outputs as address B.

Data A is output as Data B via the data bus changeover circuit which comprises an upper selection circuit 13, lower selection circuit 14 and switching circuit 15, each circuit being operated by the output signal of the upper/lower selection circuit and the data A is finally output as Data B.

Now, each circuit is described in detail. In the following description, a 16-bit microprocessor uses the data bus changing between a 16 bit width and an 8 bit width.

Figure 5:
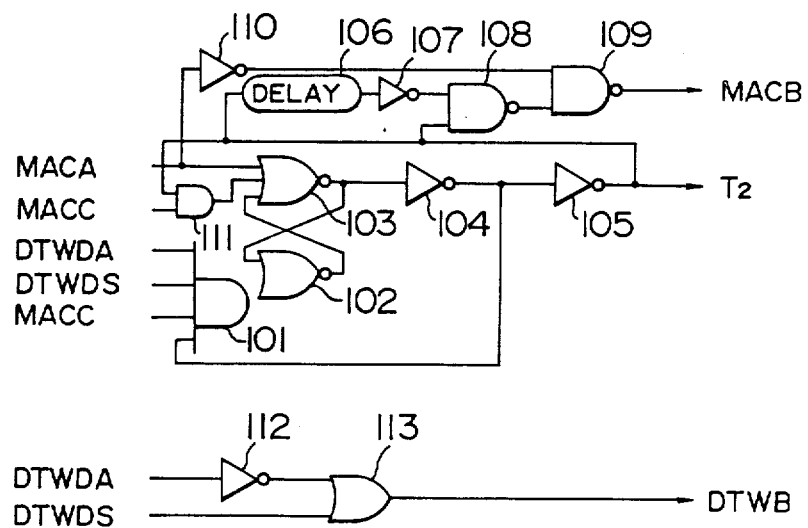
FIG. 5 is a circuit diagram of a cycle control circuit.

FIG. 5 is a circuit diagram of the cycle control circuit 11 which is an asynchronous type. The DTWDA instruction which is "H" for 16 bit wide, the DTWDS signal which is "H" for 8 bit wide and MACC signal are input to the AND gate 101 and its output terminal is connected to an input terminal of a flip-flop (FF) circuit which is composed of two NOR circuits 102 and 103. The output of the FF is transferred as $T_2$ signal via two inverters 104 and 105. The $T_2$ signal is input to a NAND gate 108 directly and via a delay circuit 106 and inverter 107. The output of the NAND gate 108 and the MACA signal via inverter 110 are input to a NAND gate 109. Therefore when an 8 bit wide data bus is selected, MACB signal is output from the NAND gate 109 upon generation of MACC signal. The FF is reset by the MACA signal or ANDed MACC signal and $T_2$ signal by an AND gate 111. The DaTa WiDth B (DTWDB) instruction is obtained by passing the DTWDS instruction and inverted to DTWDA by inverter 112 through an OR gate 113.

Figure 6:
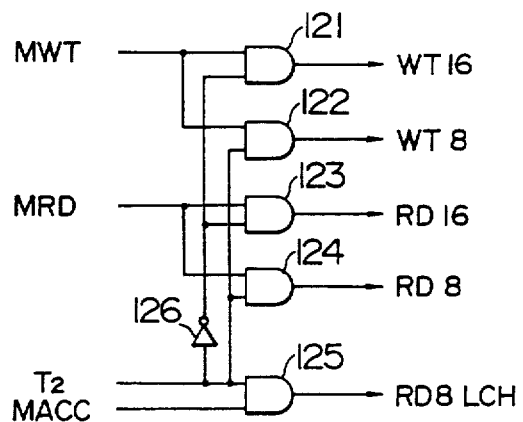
FIG. 6 is a circuit diagram of an upper/lower selection circuit.

FIG. 6 illustrates the detailed structure of the upper/lower selection circuit 12, which comprises 5 AND gates 121 to 125 and inverter 126. Since the data bus is bidirectional and Memory WriTe (MWT) signals and Memory ReaD (MRD) signals are utilized, MWT signals are input to AND gates 121 and 122 and MRD signals are input to AND gates 123 and 124. The $T_2$ signal which is generated when the 8 bit width is selected, is input to the AND gates 122 and 124, the inverted $T_2$ signal which is inverted by the inverter 126 is input to AND gates 121 and 123, and the $T_2$ signal and MACC signal are input to AND gate 125. Consequently, 16 bit write (WT16) signal, 8 bit write (WT8) signal, 16 bit read (RD16) signal, 8 bit read (RD8) signal, and 8 bit read latch (RD8LCH) signal are output from the AND gates 121 to 125, respectively.

Figure 7:
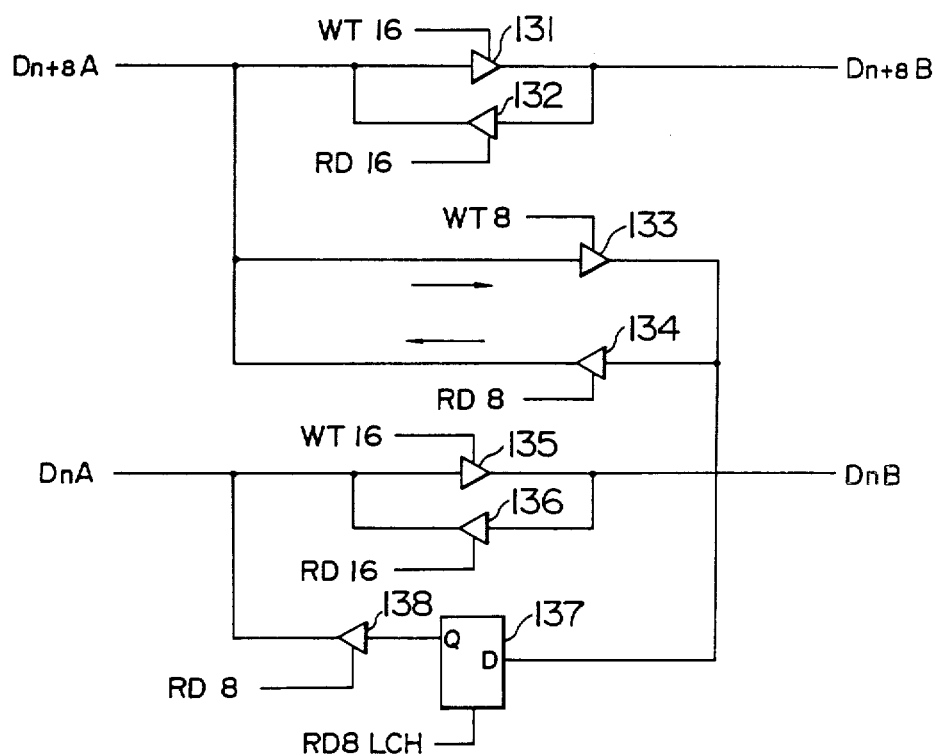
FIG. 7 is a circuit diagram of a data bus changeover circuit.

FIG. 7 shows the detailed structure of the data bus changeover circuit which comprises the upper selection circuit 13, the lower selection circuit 14 and a switching circuit 15.

The upper half of the data bus A ($D_{n+8}A$) and the upper half of the data bus B ($D_{n+8}B$) are connected via back-to-back connected three state gates 131 and 132 which are enabled by WT6 and RD16, respectively. Similary, the lower half of the data bus A ($D_nA$) and the lower half of the data bus B ($D_nB$) are connected via back-to-back connected three state gates 135 and 136. In order to use the Data bus B as 8 bit wide, the upper half of the data bus A ($D_{n+8}A$) and the lower half of the data bus B ($D_nB$) are connected via back-to-back connected three state gates 133 and 134 which are enabled by WT8 and RD8, respectively. Furthermore, there are provided latch 137 which latches the head data by RD8LCH during 8 bit wide read cycle and a three state gate 138 which is enabled by RD8.

Figure 8:
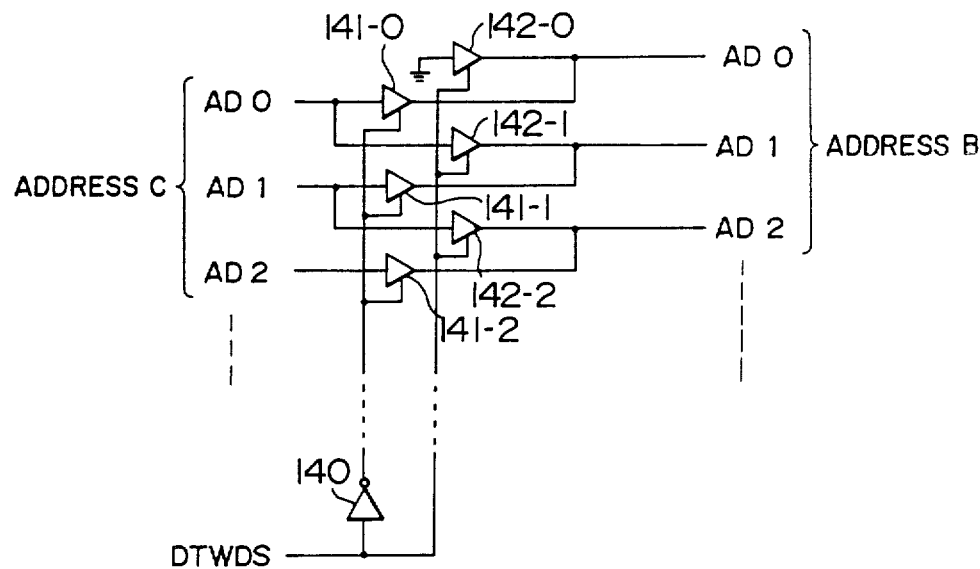
FIG. 8 is a circuit diagram of an address shift circuit.

FIG. 8 shows the detailed structure of the address shift circuit 16 which comprises a group of three state gates 141-0, 141-1, 141-2, . . . which output addresses $AD_0$, $AD_1$, $AD_2$, . . . of address B without any modification and which are enabled by DTWDS signal inverted by a inverter 140, and the other group of three state gates 142-0, 142-1, 142-2, . . . The gate 142-0 outputs "0" to $AD_0$ when enabled by DTWDS signal and the gates 142-1, 142-2, . . . connect address lines of address C to +1 shifted address lines of address B, for example, gate 142-1 connects address line $AD_0$ of address C to address line $AD_1$ of address B.

Figure 9:
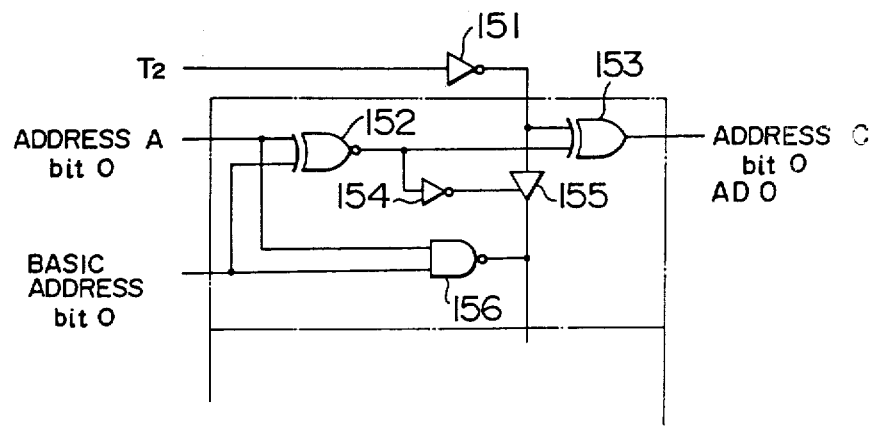
FIG. 9 is a circuit diagram of an address adder circuit.

FIG. 9 shows the detailed structure for one bit of an address adder 17 which comprises a NAND gate 156 to which address A bit 0 and basic address bit 0 are input and which forms a carry signal, an exclusive NOR gate 152 to which address A bit 0 and basic address bit 0 are input, an exclusive OR gate 153 to which $T_2$ signal inverted by an inverter 151 and the output signal of the EX-OR 152 are input, and a three state gate 155 which controls the output of the inverter 151 according to the output of the EX-NOR gate 152 inverted by an inverter 154. The EX-OR gate outputs address C bit 0 and the gate 155 intercepts the transmission of the carry signal when the address A bit 0 and basic address bit 0 coincide.

The operation of the above-mentioned bus cycle changeover circuit 10 will now be described hereinbelow.

First, when the ordinary 16 bit width is selected as the data width selection signal, Address A, Data A, Memory ACcess instruction A (MACA) and DaTa WiDth instruction A (DTWDA) are input to the bus cycle changeover circuit 10 and output to the system bus in the form of Address B, Data B, MACB and DTWDB without involving any change.

Figure 10:
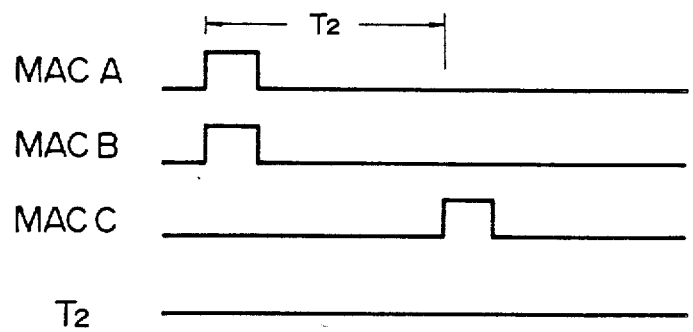
FIG. 10 is a timing chart of the operation of the bus changeover circuit when a 16 bit wide data bus is selected.

A part of the operation is shown in the timing chart in FIG. 10. According to the chart, MACB is generated upon the generation of MACA and after a certain time $T_1$, MACC signal is generated and then the bus access cycle is finished. In this case, $T_2$ cycle will never be executed.

Next, when, for example, an 8 bit width is selected as the data width, it is required to output two memory access instructions B for one memory access instruction A. That is, the memory access instruction A is converted to the memory access instruction B which is output every time when intervals $T_1$ and $T_2$ are completed. The memory access instruction A is also input to the upper/lower selection circuit, and its output controls the data transmission. In the first half time interval $T_1$, since the lower selection circuit operates and the switching circuit 15 is switched to the lower side, the lower half of the data A is output as data B on the lower half of the data bus B. In the second half time interval $T_2$, the switching circuit 15 connects the upper half of the data A to the lower half of the data bus B.

The memory address where data are stored must be changed every access cycle when the bus width is narrowed. For this purpose, in the time interval $T_2$, the basic address in time interval $T_1$ is increased by one every time $T_1$ cycle is completed by address adder 17, and the added address is shifted to one higher bit by the shift circuit 16 which is enabled while the DTWDS signal is high. Thus the address control is performed.

When an access cycle is completed, the Memory ACcess Completion (MACC) Signal is output from the bus controller 4, and the MACC signal is input to the cycle control circuit 11 and the upper/lower selection circuit to execute transition operation to the next operation.

Thus, the 16 bit wide data bus functions as an 8 bit wide data bus.

Figure 11:
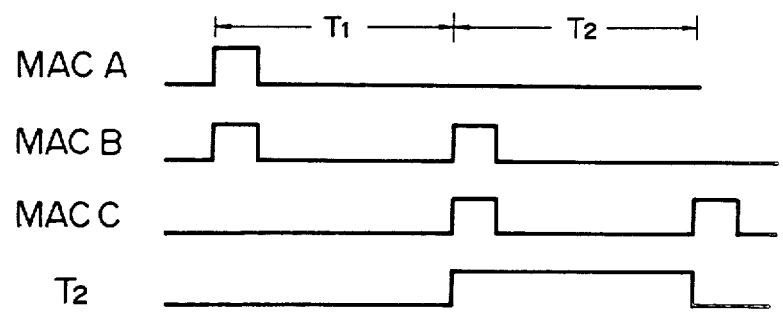
FIG. 11 is a timing chart of the operation of the bus changeover circuit when an 8 bit wide data bus is selected.

These operations are illustrated in the timing chart as shown in FIG. 11. It shows that DTWDS signal generates the MACC signal after $T_1$ and consequently $T_2$ signals are generated and that the bus access cycle will be transferred to the latter half cycle. After time interval $T_2$, the MACC signal is generated and $T_2$ signal is transferred to "0". Accordingly, two MACB signals are output by an MACA signal.

Figure 12:
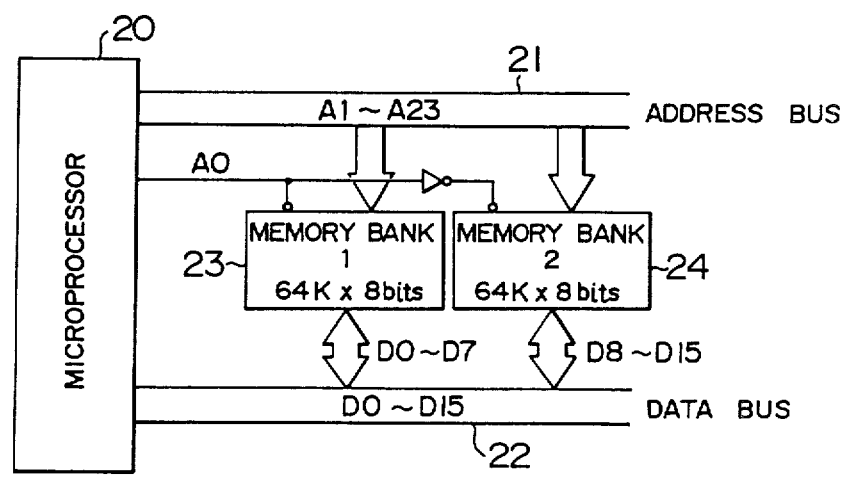
FIG. 12 is a block diagram which illustrates the system having two memory banks and the microprocessor according to the invention.

FIG. 12 illustrates the connection of two memory banks 23 and 24 to the microprocessor 20 according to the invention with address bus 21 and data bus 22. Each memory bank is composed of 64 kbit RAMs which are stacked for an 8 bit width. That is, 8 bit wide $D_0$ to $D_7$ and 8 bit wide $D_8$ to $D_{15}$ bus are connected to 16 bits wide bus $D_0$ to $D_{15}$. The address bus 21 and $A_0$ are composed of 24 bit wide $A_0$ to $A_{23}$ bus lines. When data transmission is executed using 16 bit wide bus, data of odd number addresses are stored in the memory bank (1) 23, and data of even number addresses are stored in the memory bank (2) 24.

According to the invention in which the data bus width is narrowed to 8 bit wide, addressed in the memory bank must be in sequence. In the above embodiment, the least significant bit (LSB) $A_0$ is used to switch the memory banks (1) and (2), however, when the data bus width is selected to be 8 bit wide, the LSB is fixed and the area stored in determined by the addresses $A_1$ to $A_{23}$. In this case, either of two memory banks may be selected, usually $A_0$ bit is set to "0" and the specififed addresses are shifted to one higher bit.

By using this memory structure, data bus width can be selected automatically according to the condition of mounted memory banks.

Figure 13:
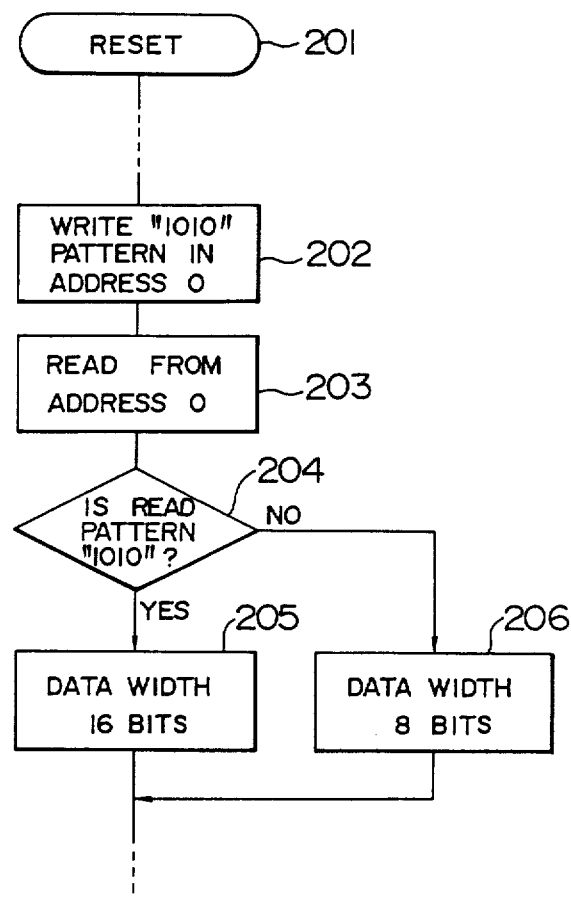
FIG. 13 is a flowchart illustrating the procedure of data bus width determination when memory boards are mounted.

FIG. 13 is a flowchart showing the procedure of automatic data bus width selection. After the system is reset (step 201), for example, hexadecimal data "1010" is written in a predetermined address, for example, address "0" (step 202), then data is read from the address "0" (step 203) and the data which is read is checked if it is "1010" (step 204) or not. If it is identified as "1010", the data bus width is determined to be 16 bits wide and if other data are obtained, the data bus width is determined to be 8 bits wide. Therefore, it is possible to know the data bus width of the mounted memory boards.

In the above embodiment, the data bus is switched between 16 bit width and 8 bit width. However, any switching between ordinarily used data bus widths, such as between 32 bit width and 8 bit width and between 32 bit width and 16 bit width can be used. The number of division can be selected as required.

According to the invention, there is provided a bus cycle changeover circuit which is located between the command execution unit and system bus output part and which performs timing control and address control according to the data width selection signal of the data selection instruction. Therefore it is possible to increase efficiency of memory because of no necessity of utilizing large capacity of memory devices for the whole data bus width.

Further, high speed access is enabled by using full assembled memory for whole data bus width.

Moreover, since the changeover of data bus width can be performed automatically after an additional or exchange memory board is mounted, no manual setting is required.

What is claimed is;

1. A microprocessor having a variable data width comprising:

a command execution unit which executes a plurality of commands;

an address output logic which outputs memory addresses to an address bus;

a data input/output logic which exchanges instructions and data between said command execution unit and a data bus;

a bus controller which outputs control signals from said command execution unit to a control bus; and a bus cycle changeover circuit which is connected between said command execution unit and each of said address output logic, said data input/output logic, and said bus controller, said bus cycle changeover circuit comprising:

a cycle control circuit which outputs data width instructions for the bus controller at an appropriate timing for a selected data width according to an externally supplied data width selection signal, a memory access instruction for the bus controller depending on the data width, and a signal expressing a latter half access cycle, an upper/lower selection circuit which selects an upper part or a lower part of the data bus according to the signal expressing the latter half access cycle from the cycle control circuit, a data bus changeover circuit which receives, modifies and transmits data at said timing through said data input/output logic according to the output of said upper/lower selection circuit, an address adder circuit which adds address values according to said signal expressing the latter half access cycle, and a shift circuit which shifts the address outputted from the address adder circuit at said timing according to said data width selection signal to supply it to the bus through the data input/output logic.

2. A microprocessor according to claim 1, wherein said data bus changeover circuit comprises an upper selection circuit which transmits/receives the upper data to/from the upper part of the data bus without any modification, a lower selection circuit which transmits/receives the lower data to/from the lower part of the data bus, and a switching circuit which permits data transfer between the upper part of the bus and the lower part of the bus when the width of the data bus is being narrowed.

3. A microprocessor according to claim 1, wherein the data bus width is switched between a full width and a half width.

4. A microprocessor according to claim 1, including means for producing said data width selection signal dependent on data width detection according to a procedure in which predetermined data are written into a predetermined memory address, the predetermined data are read from the predetermined memory address, and the read data are compared to the written data to determine data width.

5. A microprocessor according to claim 1, wherein said bus cycle changeover circuit outputs the memory access instruction at a timing determined by the data width of the bus.

* * * * *